Patented Nov. 6, 1923.

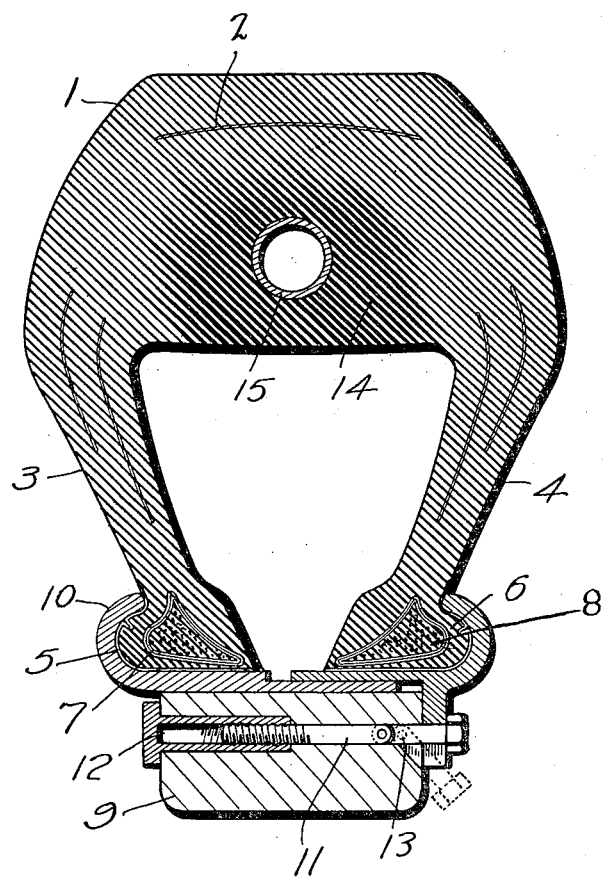

1,473,502

UNITED STATES PATENT OFFICE.

CHARLES EDWARD MURRAY, JR., OF TRENTON, NEW JERSEY.

RESILIENT TIRE.

Application filed July 1, 1922. Serial No. 572,210.

*To all whom it may concern:*

Be it known that I, CHARLES EDWARD MURRAY, Jr., a citizen of the United States, residing at Trenton, in the county of Mercer and State of New Jersey, have invented certain new and useful Improvements in Resilient Tires, of which the following is a specification.

This invention relates to resilient tires and it comprises a hollow resilient tire having side wings, bases and means for confining the same in position on the rim of a wheel, a tread portion having embedded therein and vulcanized thereto, an expanding device of relatively hard rubber or the like which may be reinforced by a rigid advantageously metallic expanding device, and the hard rubber embedded in the tread, advantageously, gradually merging into the soft rubber of the tread; all as more fully hereinafter set forth and as claimed.

In the accompanying drawing I have shown one form of the specific embodiment of my invention. The view is a vertical transverse section through a portion of my tire.

Referring to the drawing, 1 is a thread or crown portion of the tire containing reinforcing material 2 such as fabric or the like. The tire is provided with side wings 3 and 4 arranged to be placed under tension. The wings in turn are provided with the rim engaging clincher bases 5 and 6 which may be reinforced with fabric 7 and wires 8.

The rim 9 of the wheel is provided with clincher portions 10 for embracing and confining the clincher bases 5 and 6 of the tire. The clincher portions of this rim are movable relative to each other and may be fastened together by means of the bolt 11 operating in the socket 12. This places the side walls under tension. The bolt is preferably made in two parts pivoted together as at 13. When the bolt is loosened from its fastening in the socket and its head is a certain distance from the edge of the rim in which it is confined the bolt may be turned on its pivot 13 and then the clincher portions of the rim which are confined by the head of the bolt are disengaged and may be removed from the rim, thereby permitting the removal of the tire. The particular rim and locking device form no part of my present invention.

The tread portion of the tire is made of relatively softer rubber of the composition ordinarily used for tire treads gradually merging into hard rubber 14. This rubber may be of sufficient strength to act as a mechanical expanding device holding the tire in proper shape when the side walls 3 and 4 are stretched. The tire is confined on the rim by the locking device described.

For the purpose of reinforcement of the hard rubber or for the purpose of acting as an expanding device itself, I may use the rigid member 15 shown as the metallic pipe embedded in the hard rubber. This may be of any shape such as a curved plate or the like.

The advantage of this construction is that due to relative movements of the parts in use, any abrasion between the member 15 and the hard rubber 14 will be immaterial, since the hard rubber 14 will not be under any material expansion and will not tend to rupture or tear. The hard rubber 14 gradually merging into the softer rubber 1 of the tread provide a cushion tread which will not rupture in use. The hard rubber expanding device 14 or the supplemental rigid expanding device 15 serve to keep the tire in shape when the bases are confined in the rim as described. The construction is such that the rubber of the tread does not pull away from the hard rubber expanding device, and any relative movement between the hard rubber and the reinforcing member will not cause incipient rupture which will be communicated to the tread.

This supplemental expanding device 15 may be made of wood or the like and need not necessarily be in the exact shape described, although it is, advantageously, embedded in the hard rubber resulting in a tire in which the tread, although containing a metallic or wooden expanding device which may tend to move relative to the tread, is not subject to abrasion and consequent rupture.

The side walls of the tire are placed under tension when the tire is confined on the rim and the pull at the tread is from the soft rubber gradually merging into the hard rubber and not away from a metallic or wooden expanding device.

What I claim is:—

1. In a hollow resilient tire having bases and means for confining the same in position, an annular expanding device comprising a rigid metal member embedded in rubber contacting with the inner periphery of the tread of the tire at certain points, the rubber at the points of contact being substantially of the same composition as the rubber of the tread of the tire and at other points being of harder rubber, the expansion device being located within the harder rubber.

2. In a hollow resilient tire, means for expanding the periphery thereof, said means comprising an annular expanding device including a metallic member maintained out of contact with the tire and a cushioning member surrounding the metallic member, said cushioning member comprising an annular block of rubber contacting with the inner periphery of the tread portion of the tire, such block approximating in composition the material of the tire at points of contact therewith but being of harder material at other points.

3. In a hollow resilient tire, means for expanding the periphery thereof, said means comprising an expanding device including a metallic member maintained out of contact with the tire and a cushioning member surrounding the metallic member, said cushioning member comprising an annular block of rubber contacting with the inner periphery of the tread portion of the tire and such block approximating in composition the material of the tire at points of contact therewith but being of harder material at other points and being vulcanized to the inner periphery of the tire.

4. A resilient tire having side wings arranged to be placed under tension, bases at the lower end of the wings, means for confining the wings under tension in position on the rim of the wheel, a tread portion having embedded therein and vulcanized thereto an expanding device of relatively hard rubber.

5. A resilient tire having side wings arranged to be placed under tension, bases at the lower end of the wings, means for confining the wings under tension in position on the rim of the wheel, a tread portion having embedded therein and vulcanized thereto an expanding device of relatively hard rubber reinforced by a rigid mechanical expanding device.

6. A resilient tire having side wings arranged to be placed under tension, bases at the lower end of the wings, means for confining the wings under tension in position on the rim of the wheel, a tread portion having embedded therein and vulcanized thereto an expanding device of relatively hard rubber reinforced by a rigid metallic expanding device.

In testimony whereof, I have hereunto affixed my signature.

CHARLES EDWARD MURRAY, Jr.